United States Patent
Roberts et al.

(10) Patent No.: US 7,302,925 B2
(45) Date of Patent: Dec. 4, 2007

(54) MANIFOLD GASKET HAVING PUSHROD GUIDE

(75) Inventors: Brian Roberts, Carpentersville, IL (US); Gerald Rosenquist, Lake Zurich, IL (US); Joseph Hermanson, Chicago, IL (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 62 days.

(21) Appl. No.: 11/193,812

(22) Filed: Jul. 29, 2005

(65) Prior Publication Data

US 2007/0022993 A1    Feb. 1, 2007

(51) Int. Cl.
*F01L 1/14* (2006.01)

(52) U.S. Cl. .............. 123/90.61; 123/90.37; 413/9; 413/58; 277/598; 29/888.3

(58) Field of Classification Search ............ 123/90.61
See application file for complete search history.

(56) References Cited

U.S. PATENT DOCUMENTS

| | | | | | |
|---|---|---|---|---|---|
| 5,105,777 | A | * | 4/1992 | Kronich et al. | 123/193.3 |
| 5,983,849 | A | * | 11/1999 | Wangen et al. | 123/90.61 |
| 6,237,557 | B1 | * | 5/2001 | Wiegert | 123/193.5 |
| 6,883,483 | B1 | * | 4/2005 | Knudsen et al. | 123/90.37 |

\* cited by examiner

*Primary Examiner*—Thomas Denion
*Assistant Examiner*—Kyle M. Riddle
(74) *Attorney, Agent, or Firm*—Robert L. Stearns; Dickinson Wright PLLC

(57) ABSTRACT

A manifold gasket assembly includes a steel carrier fabricated with a plurality of air intake openings. Rubber material is molded to the carrier body to provide a seal about the openings when the gasket assembly is clamped between a cylinder head and intake manifold. Pushrod guides are provided on the carrier body and are fabricated of a material different than that of the carrier body, namely the same material as that used to form the elastomeric sealing beads.

9 Claims, 2 Drawing Sheets

MANIFOLD GASKET HAVING PUSHROD GUIDE

BACKGROUND OF THE INVENTION

1. Technical Field

This invention generally relates to gaskets, and more particularly to intake manifold gaskets incorporating a feature for guiding the installation of pushrods of the engine.

2. Related Art

It is known to incorporate a feature into intake manifold gaskets for guiding pushrods during the assembly of the engine. One such gasket assembly includes a rigid carrier frame of the gasket made of plastic and formed with a plurality of media-conveying openings corresponding to associated openings communications between the cylinder head and the manifold between which the gasket is to be bolted. Elastomeric sealing beads are molded to both sides of the carrier about the media-conveying openings to seal the openings when the intake manifold is bolted to the cylinder head. A plurality of forked pushrod holder/guides molded as one piece with the rigid plastic carrier frame project out of the plane of the gasket at an angle and beyond its periphery. The guides support the pushrods on the carrier in a pre-assembly stage as the engine progresses along the assembly line. While such pushrod support/guides of this type are effective for their intended purpose, the shape, location, and rigid material of the forked guides presents an obstruction to the ultimate installation of the pushrods into their use position, the installation of the rocker arms and the positioning and mounting of the manifold on the cylinder head, making the assembly process of the engine more difficult than would be desired if the pushrod supports were not in the way.

The carrier frame of other known manifold gaskets is made of metal instead of plastic. Features such as the forked pushrod guide described above are not easily made from the metal carrier material without adding significant cost and manufacturing subs to the process. Even if they could be made, such a gasket would still suffer from the deficiencies of presenting an obstruction to the installation of the intake manifold, pushrods and rocker arms as described above.

The present invention overcomes or greatly minimizes the foregoing deficiencies of the prior manifold gaskets described above.

SUMMARY OF THE INVENTION AND ADVANTAGES

A manifold gasket assembly includes a carrier body adapted to be clamped between a cylinder head and an intake manifold of an engine. The carrier is formed with a plurality of media-conveying openings corresponding to media-conveying passages communicating between the manifold and head. Elastically resilient sealing material is disposed on the carrier body in surrounding relation to at least some of the openings to provide a fluid-type seal when the carrier body is clamped between the cylinder head and manifold. At least one pushrod guide is formed from a material different than that of a carrier body and is mounted on and projects from the carrier body adjacent at least one of the openings in position to guide a pushrod during its installation in the engine.

According to a further preferred aspect of the invention, the pushrod guide is fabricated of the same rubber sealing material as that which surrounds and seals the openings, and the carrier body is preferably fabricated of metal.

The gasket assembly of the invention has the advantage of using material other than the carrier body material to serve as the pushrod guide. Particular advantages are recognized when the pushrod guides are fabricated of the elastic sealing material, since the sealing material needs to be molded to the carrier body anyway and it is a simple task to simply extend the material to the area where the pushrod guide is desired.

Another advantage of fabricating the pushrod guide of the elastic sealing material is that it can be located where it is effective as a pushrod guide but out of the way during the assembly of other parts of the engine.

THE DRAWINGS

These and other features and advantages of the present invention will become more readily appreciated when considered in connection with the following detailed description and appended drawings, wherein.

DETAILED DESCRIPTION

Figure 1:
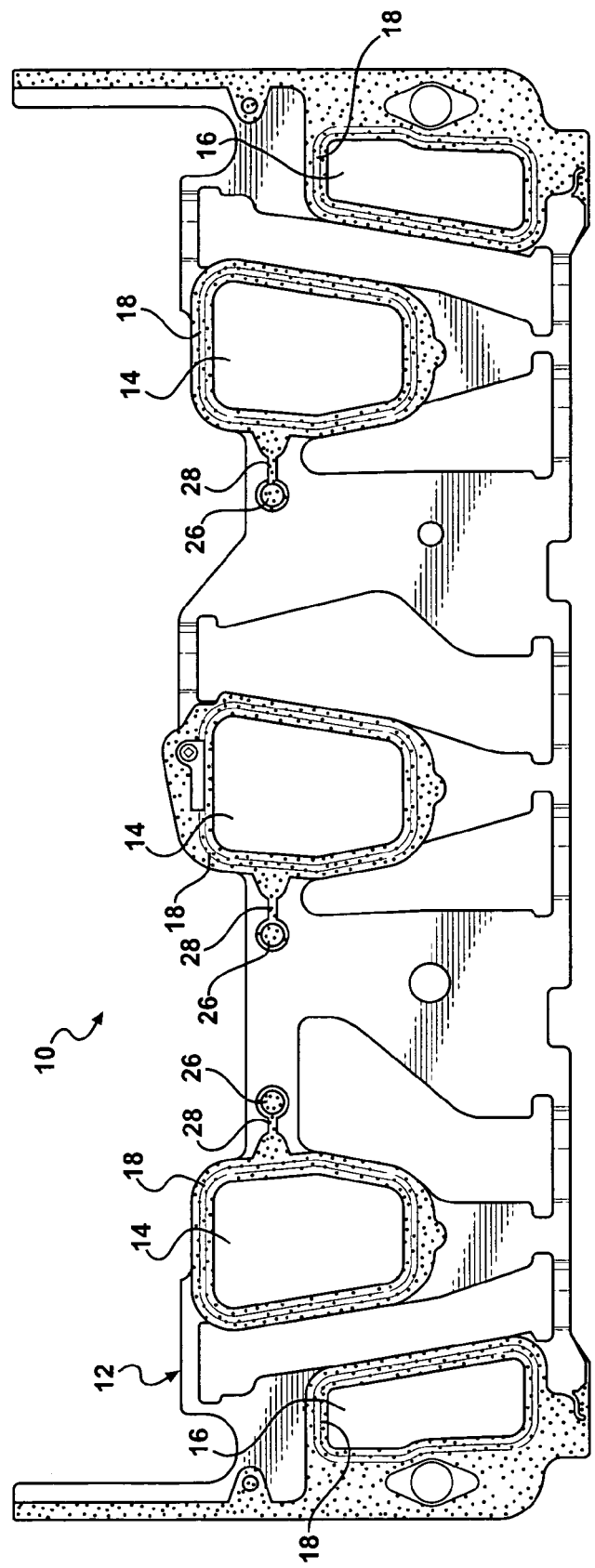
FIG. 1 is a perspective view of a manifold gasket constructed according to a presently preferred embodiment of the invention.

A gasket assembly constructed according to a presently preferred embodiment of the invention is shown generally at 10 in the drawings and includes a gasket carrier body 12 formed with at least one and preferably a plurality of media-conveying openings, including air intake openings 14 and engine coolant openings 16. The openings correspond to media-conveying passages communicating between a cylinder head 20 and an intake manifold of an internal combustion engine 24 between which the gasket assembly 10 is to be clamped. Elastically resilient sealing material, such as rubber, is molded to the carrier body 12 in surrounding relation to at least some and preferably all of the media-conveying openings 14, 16 as illustrated best in FIG. 2. The elastomeric seal beads 18 are molded to both sides of the carrier body 12 and project from the carrier body 12 so as to be compressed when the gasket assembly 10 is clamped between the cylinder head 20 and intake manifold 22.

The gasket assembly is provided with at least one and preferably a plurality of pushrod guides 26. The pushrod guides 26 are preferably formed adjacent each of the air intake openings 14. The pushrod guides 26 are spaced inwardly from an outer periphery of the carrier body 12 and project out of the plane of the carrier body 12. Each pushrod guide 26 preferably has a single tapered pin configuration, although other shapes are contemplated by the invention. The pushrod guides 26 are fabricated of a material different than that of the carrier body 12. The pushrod guides 26 are preferably molded of the same elastomeric material as that used to form the sealing beads 18 surrounding the openings 14. It is preferred that the pushrod guides 26 be fabricated entirely of the elastomeric seal material 18. The invention contemplates that different sealing materials may be used for different openings and for different gaskets, and that the guides 26 can be made of the same or different material than that of the sealing beads 18.

Figure 2:
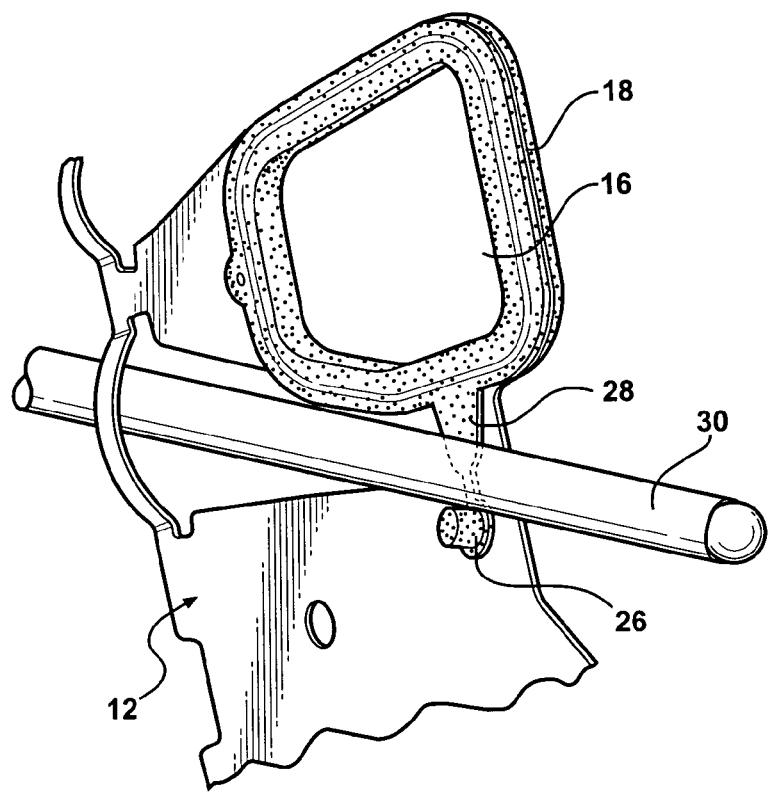
FIG. 2 is an enlarged fragmentary perspective view showing details of the pushrod guide portion of the gasket assembly of FIG. 1.
Figure 3:
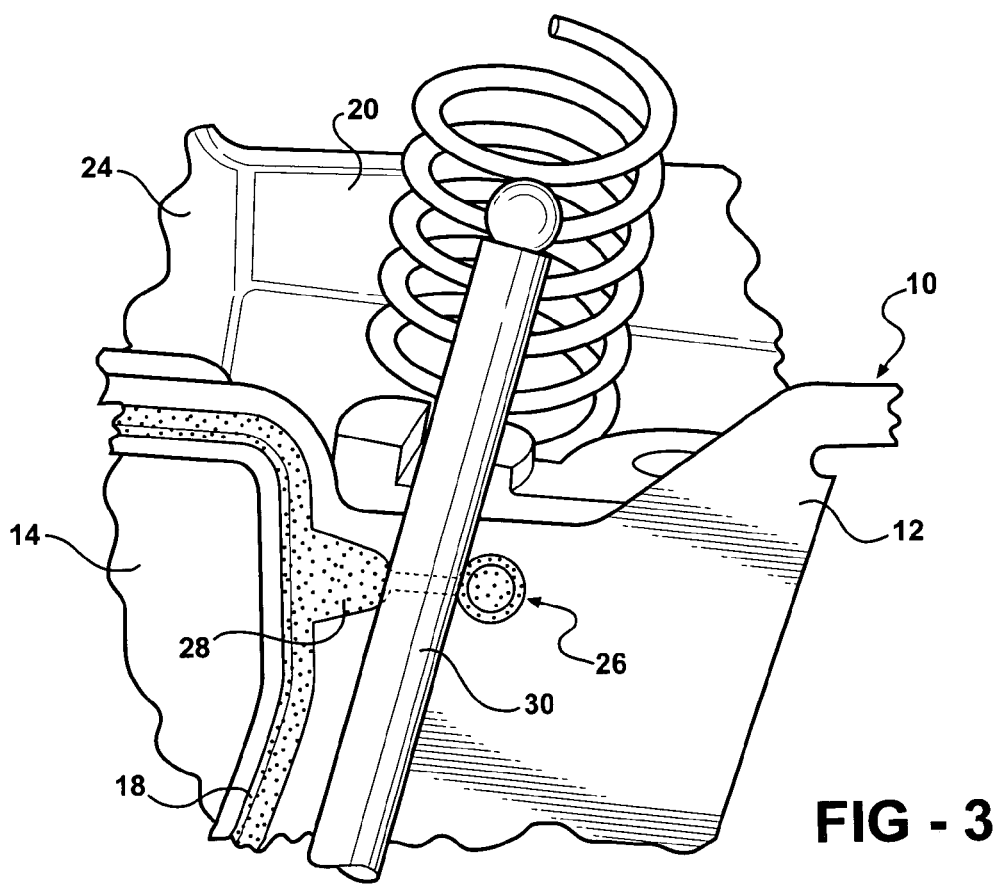
FIG. 3 is an enlarged fragmentary plan view showing the gasket installed on the cylinder head and guiding the installation of the pushrod.

As shown best in FIG. 2, the pushrod guides 26 are spaced laterally from the openings 14. The guides 26 may be connected to the elastomeric seal material 18 that surrounds the openings by an intervening connecting webs 28 that extend across a surface of the carrier body 12 and underlie the pushrod 30 when in use, as illustrated in FIG. 4. As also illustrated in FIG. 4, the pushrod guides 26 serve as a lateral stop to help guide the pushrod 30 during its installation in the engine. Following installation, the pushrod guides 26 do not interact with the pushrods during operation of the engine (the pushrods are spaced from the guides in operation), but are only used for guiding installation of the pushrods 30.

Obviously, many modifications and variations of the present invention are possible in light of the above teachings. It is, therefore, to be understood that within the scope of the appended claims, the invention may be practiced otherwise than as specifically described.

What is claimed is:

1. A manifold gasket assembly for an internal combustion engine, comprising:
    a carrier body adapted to be clamped between a cylinder head and a manifold of the engine, said carrier body having at least one media-conveying opening;
    elastically resilient sealing material disposed on said carrier body in surrounding relation to said at least one opening operative to form a fluid-tight seal about said at least one opening when said carrier body is clamped between the cylinder head and the manifold;
    at least one push rod guide formed from a material different than that of said carrier body mounted on and projecting from said carrier body in position to provide a guide surface for a pushrod during installation of the pushrod in the engine; and
    a connecting web of said elastically resilient sealing material extending between said at least one pushrod guide and a ring of said elastically resilient sealing material extending about an adjacent said at least one opening.

2. The assembly of claim 1, wherein said at least one pushrod guide is fabricated of said elastically resilient sealing material.

3. The assembly of claim 2, wherein said at least one pushrod guide has a generally cylindrical pin configuration projecting from said carrier body.

4. The assembly of claim 2, wherein said elastically resilient sealing material comprises a rubber material.

5. The assembly of claim 1 wherein said connecting web extends across a surface of said carrier body.

6. The assembly of claim 1 wherein said carrier body is fabricated of metal and said at least one pushrod guide is fabricated of a rubber material.

7. The assembly of claim 1 wherein said carrier body is fabricated of metal and said at least one pushrod guide is fabricated of the same material as that of the elastically resilient sealing material.

8. The assembly of claim 7, wherein said pushrod guide is molded to said carrier body.

9. The assembly of claim 1, wherein said gasket body has a plurality of said openings and a plurality of said pushrod guides.

* * * * *

(12) INTER PARTES REEXAMINATION CERTIFICATE (0397th)
United States Patent
Roberts et al.

(10) Number: US 7,302,925 C1
(45) Certificate Issued: Jun. 26, 2012

(54) MANIFOLD GASKET HAVING PUSHROD GUIDE

(75) Inventors: Brian Roberts, Carpentersville, IL (US); Gerald Rosenquist, Lake Zurich, IL (US); Joseph Hermanson, Chicago, IL (US)

(73) Assignee: Citibank, N.A., New York, NY (US)

Reexamination Request:
No. 95/000,430, Jan. 23, 2009

Reexamination Certificate for:
Patent No.: 7,302,925
Issued: Dec. 4, 2007
Appl. No.: 11/193,812
Filed: Jul. 29, 2005

(51) Int. Cl.
*F01L 1/14* (2006.01)
*F02F 11/00* (2006.01)

(52) U.S. Cl. ............ 123/90.61; 123/90.37; 413/9; 413/58; 277/598; 29/888.3

(58) Field of Classification Search .......... 123/90.61
See application file for complete search history.

(56) References Cited

To view the complete listing of prior art documents cited during the proceeding for Reexamination Control Number 95/000,430, please refer to the USPTO's public Patent Application Information Retrieval (PAIR) system under the Display References tab.

*Primary Examiner* — Robert M. Fetsuga

(57) ABSTRACT

A manifold gasket assembly includes a steel carrier fabricated with a plurality of air intake openings. Rubber material is molded to the carrier body to provide a seal about the openings when the gasket assembly is clamped between a cylinder head and intake manifold. Pushrod guides are provided on the carrier body and are fabricated of a material different than that of the carrier body, namely the same material as that used to form the elastomeric sealing beads.

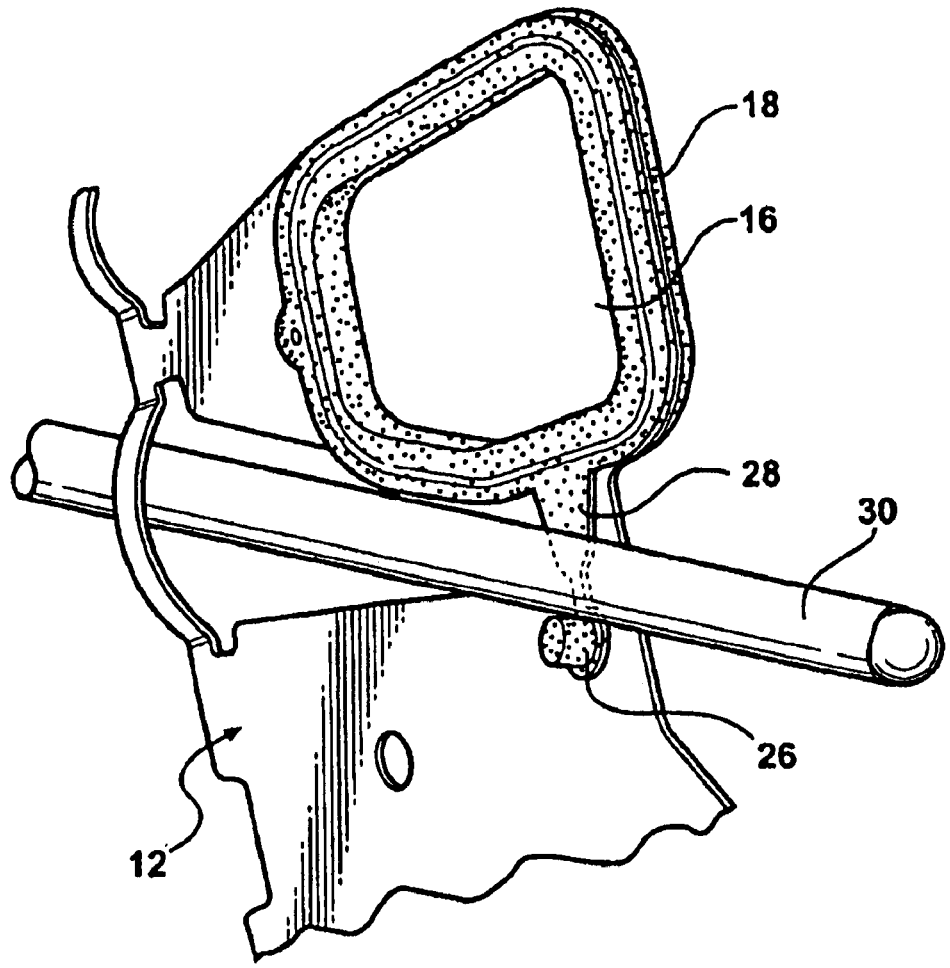

INTER PARTES REEXAMINATION CERTIFICATE ISSUED UNDER 35 U.S.C. 316

THE PATENT IS HEREBY AMENDED AS INDICATED BELOW

AS A RESULT OF REEXAMINATION, IT HAS BEEN DETERMINED THAT:

The patentability of claims 2-6 is confirmed.

Claims 1 and 7-9 are cancelled.

\* \* \* \* \*